US012475734B2

(12) United States Patent
Kim et al.

(10) Patent No.: US 12,475,734 B2
(45) Date of Patent: Nov. 18, 2025

(54) DISPLAY APPARATUS

(71) Applicant: LG DISPLAY CO., LTD., Seoul (KR)

(72) Inventors: Wonrae Kim, Paju-si (KR); Seungbum Lee, Paju-si (KR); Younghoon Kim, Paju-si (KR); Yoonsik Yang, Paju-si (KR); Seungcheol You, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 392 days.

(21) Appl. No.: 18/034,787

(22) PCT Filed: May 21, 2021

(86) PCT No.: PCT/KR2021/006383
§ 371 (c)(1),
(2) Date: May 1, 2023

(87) PCT Pub. No.: WO2022/092466
PCT Pub. Date: May 5, 2022

(65) Prior Publication Data
US 2023/0413639 A1   Dec. 21, 2023

(30) Foreign Application Priority Data

Nov. 2, 2020   (KR) .................. 10-2020-0144527

(51) Int. Cl.
G06V 40/13      (2022.01)
H10K 59/38      (2023.01)
(Continued)

(52) U.S. Cl.
CPC ......... G06V 40/1318 (2022.01); H10K 59/38 (2023.02); H10K 59/40 (2023.02);
(Continued)

(58) Field of Classification Search
CPC .... G06V 40/1318; H10K 59/38; H10K 59/40; H10K 59/65; H10K 59/8731;
(Continued)

(56) References Cited

U.S. PATENT DOCUMENTS

| 2008/0221645 A1* | 9/2008 | Kennedy | A61B 5/6846 |
| | | | 977/950 |
| 2014/0200681 A1* | 7/2014 | Kennedy | A61B 5/0006 |
| | | | 623/25 |

(Continued)

FOREIGN PATENT DOCUMENTS

| EP | 3425670 A1 * | 1/2019 | ............ H10K 39/34 |
| JP | 2020067834 A | 4/2020 | |

(Continued)

OTHER PUBLICATIONS

International Search Report and Written Opinion issued in corresponding International Patent Application No. PCT/KR2021/006383, dated Aug. 31, 2021.

Primary Examiner — Mohammed Shamsuzzaman
(74) Attorney, Agent, or Firm — Morgan, Lewis & Bockius LLP

(57) ABSTRACT

A display apparatus according to an embodiment of the present disclosure includes: a panel which includes a light emitting area and at least one non-light emitting area; a light emitting device which is disposed in the light emitting area and includes a first electrode, a light emitting stack, and a second electrode; a light converter which partitions an opening of the light emitting area and includes a light conversion material; and a capping layer disposed on the second electrode. The light converter includes a light conversion layer and a light amplifier.

15 Claims, 11 Drawing Sheets

(51) Int. Cl.
*H10K 59/40* (2023.01)
*H10K 59/65* (2023.01)
*H10K 59/80* (2023.01)

(52) U.S. Cl.
CPC ......... *H10K 59/65* (2023.02); *H10K 59/8731* (2023.02); *H10K 59/8792* (2023.02)

(58) Field of Classification Search
CPC ............. H10K 59/8792; H10K 59/124; H10K 59/122; H10K 50/00; H10F 39/12; H10F 39/198
See application file for complete search history.

(56) References Cited

U.S. PATENT DOCUMENTS

| | | | | |
|---|---|---|---|---|
| 2017/0220838 | A1* | 8/2017 | He | G06F 3/0412 |
| 2019/0013368 | A1* | 1/2019 | Chung | H10K 59/65 |
| 2020/0083302 | A1* | 3/2020 | Park | H10K 50/828 |
| 2020/0111851 | A1* | 4/2020 | Park | G06F 3/0412 |
| 2021/0120324 | A1* | 4/2021 | Seo | H10K 59/40 |
| 2021/0200366 | A1* | 7/2021 | Bok | G06V 10/17 |
| 2021/0240963 | A1* | 8/2021 | Nakamura | A61B 5/1172 |
| 2022/0383655 | A1* | 12/2022 | Hao | G06V 40/1318 |

FOREIGN PATENT DOCUMENTS

| | | |
|---|---|---|
| KR | 10-2017-0106425 A | 9/2017 |
| KR | 10-1924916 B1 | 12/2018 |
| KR | 10-2019-0004678 A | 1/2019 |
| KR | 10-2020-0030222 A | 3/2020 |
| KR | 10-2020-0040196 A | 4/2020 |

* cited by examiner

[Fig. 1]
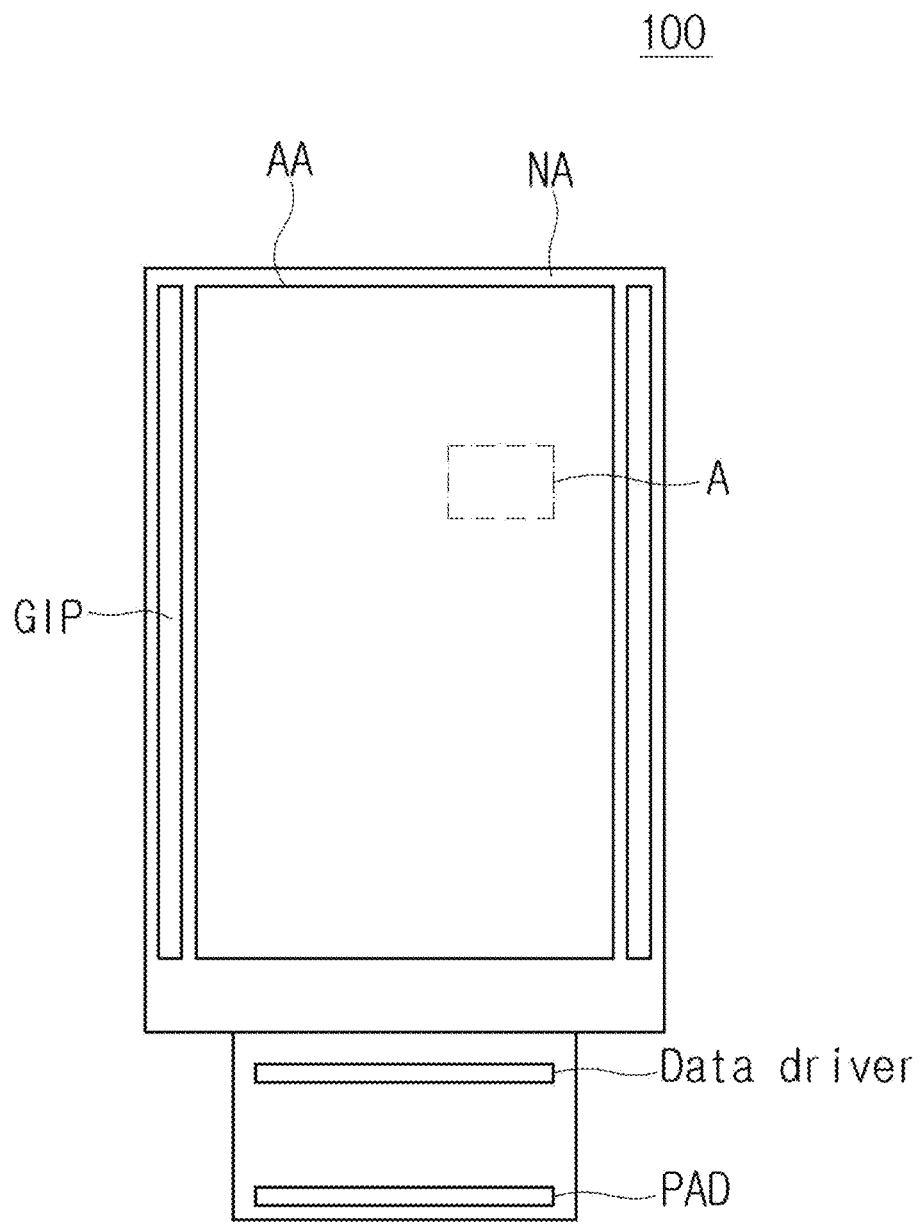

[Fig. 2A]
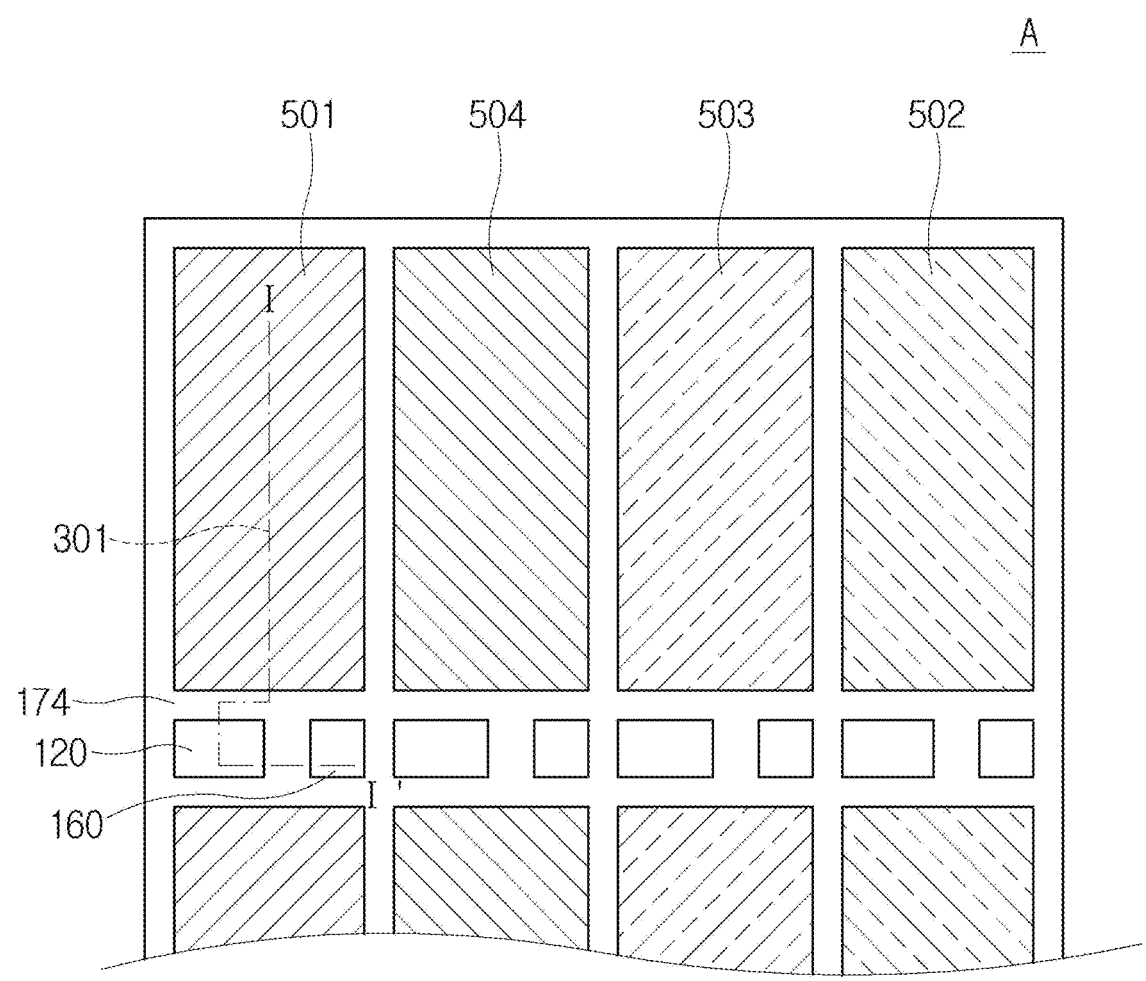

[Fig. 2B]
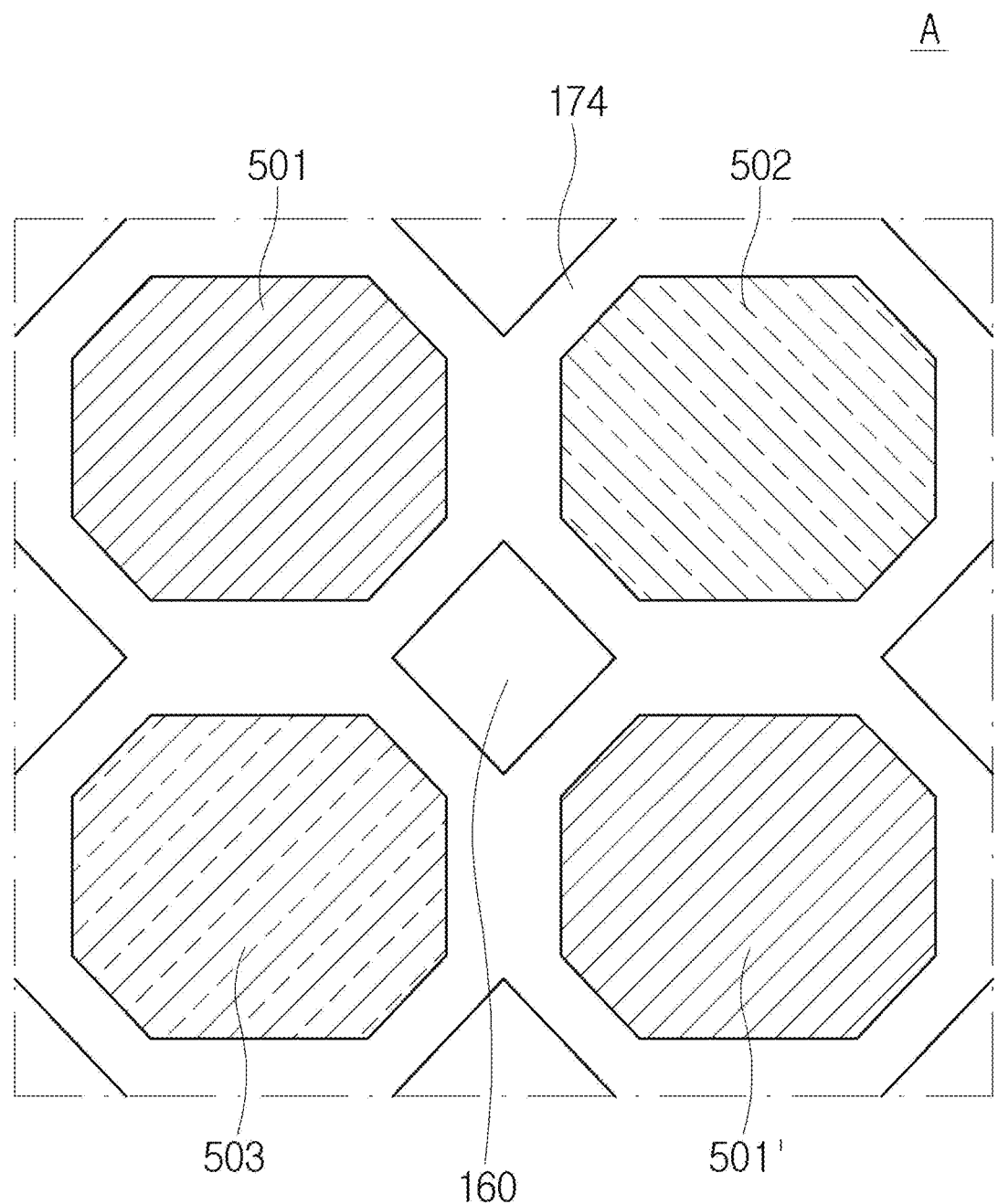

[Fig. 3]
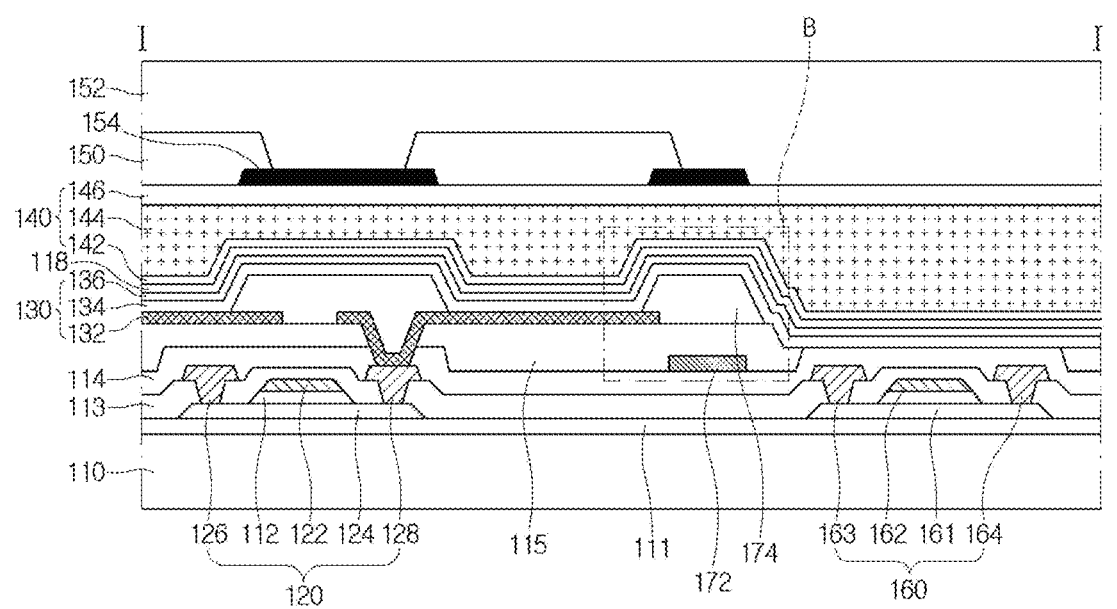

[Fig. 4]
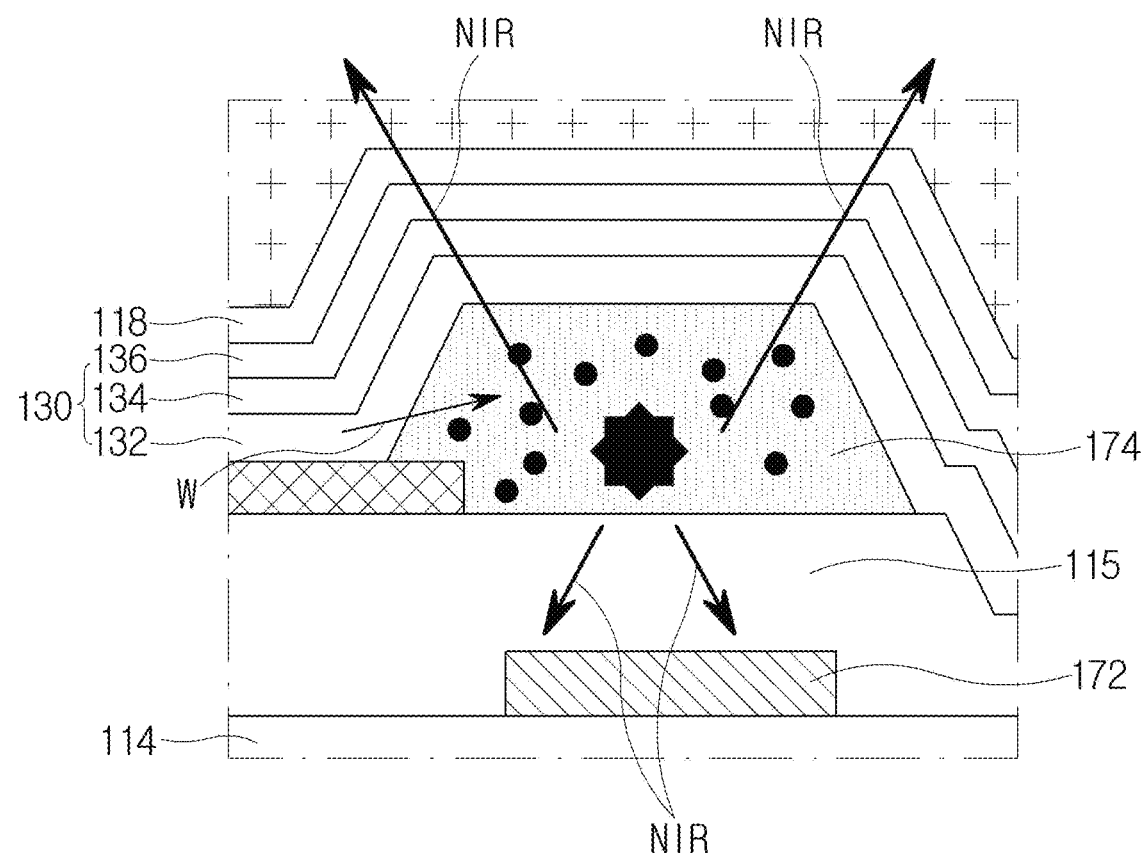

[Fig. 5]
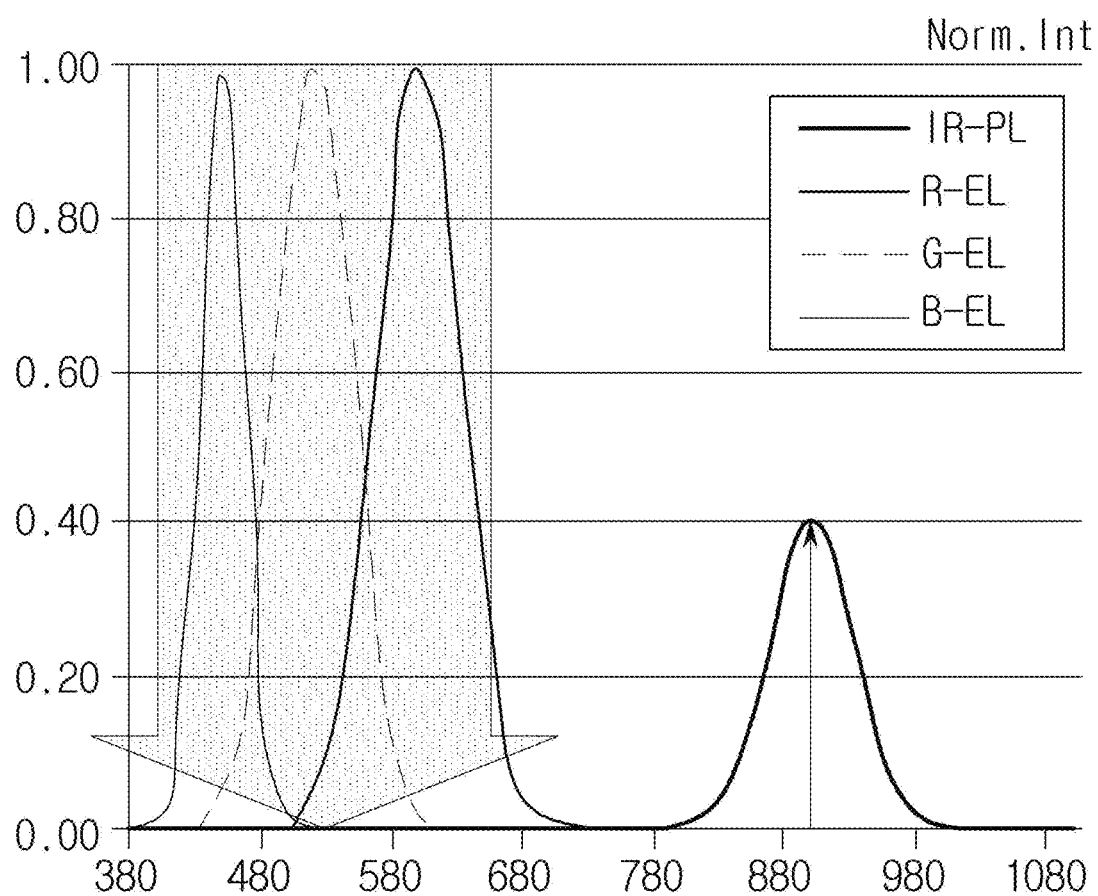

[Fig. 6A]
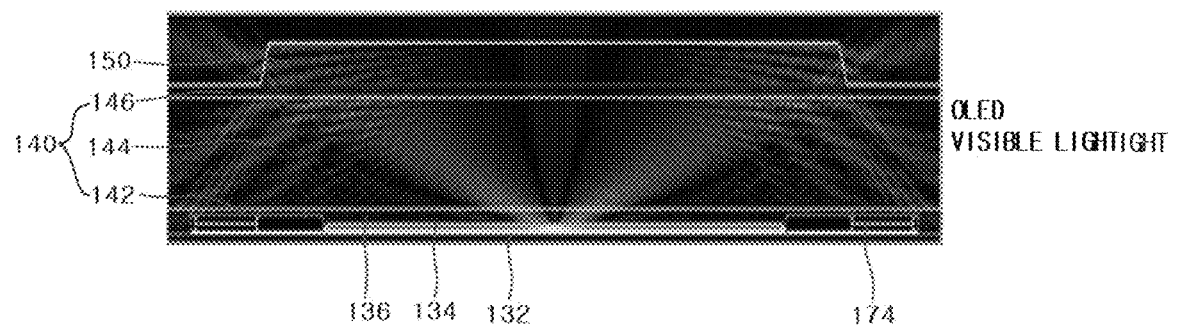

[Fig. 6B]
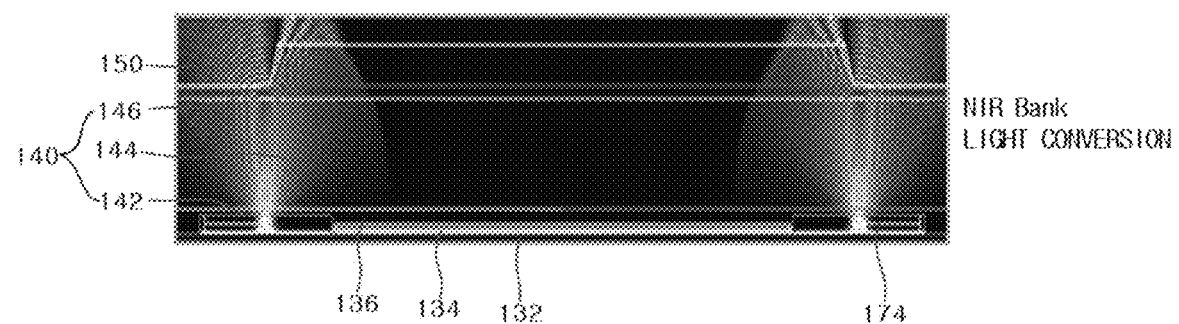

[Fig. 7]
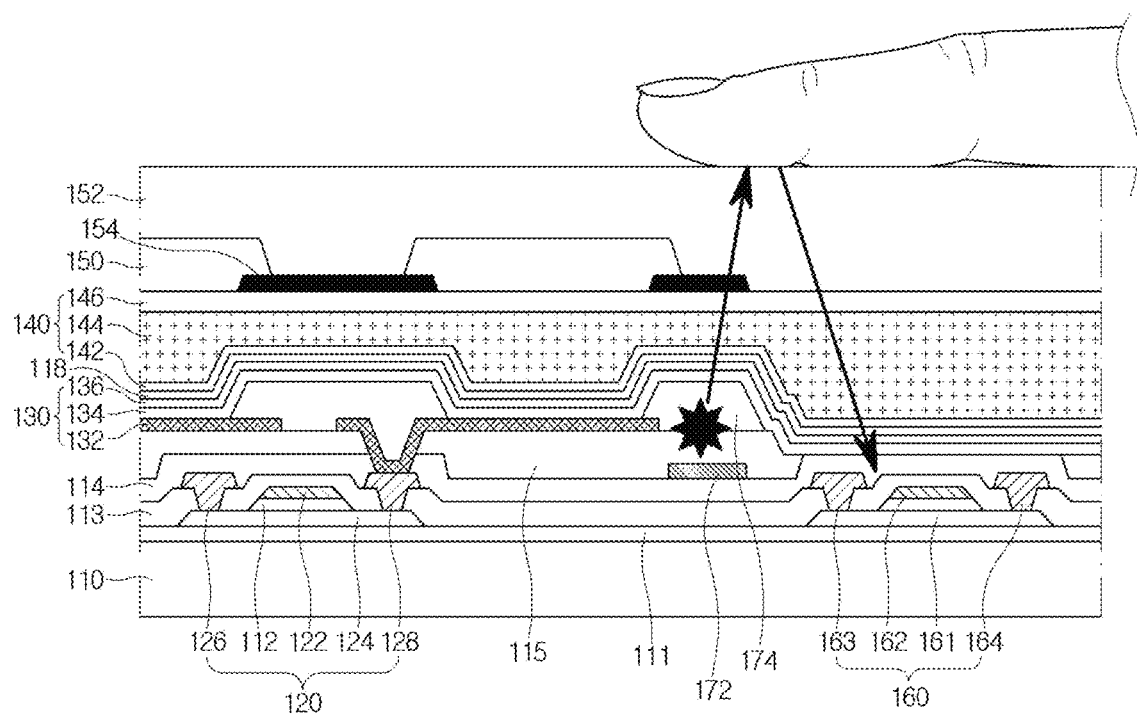

[Fig. 8]
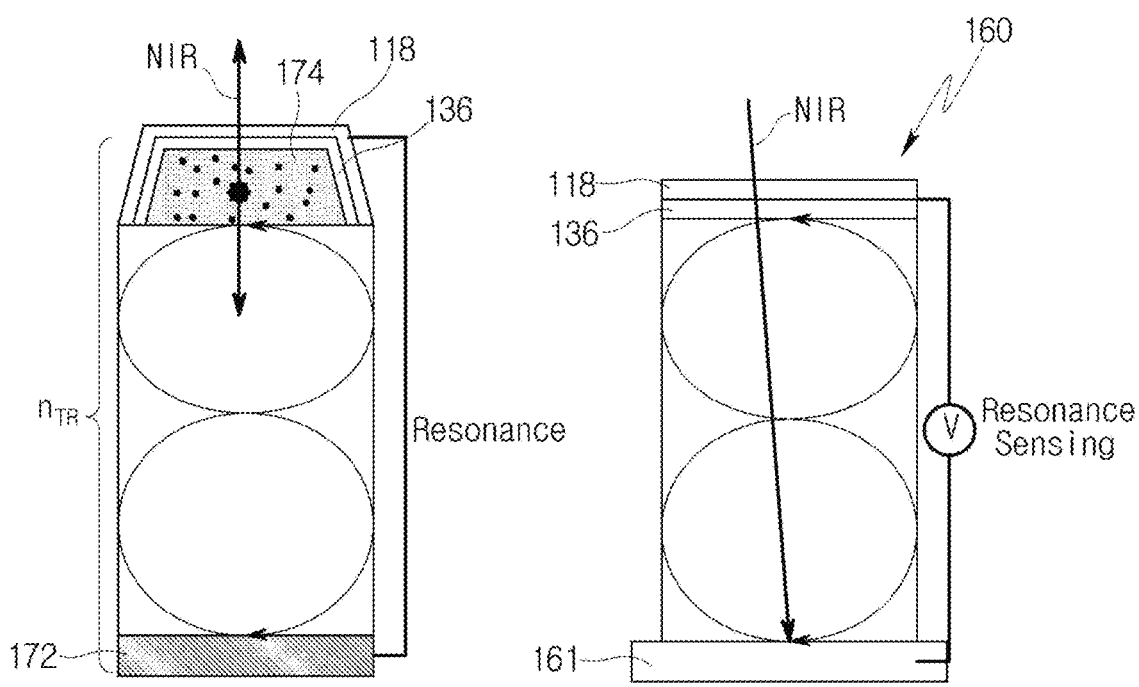

[Fig. 9]
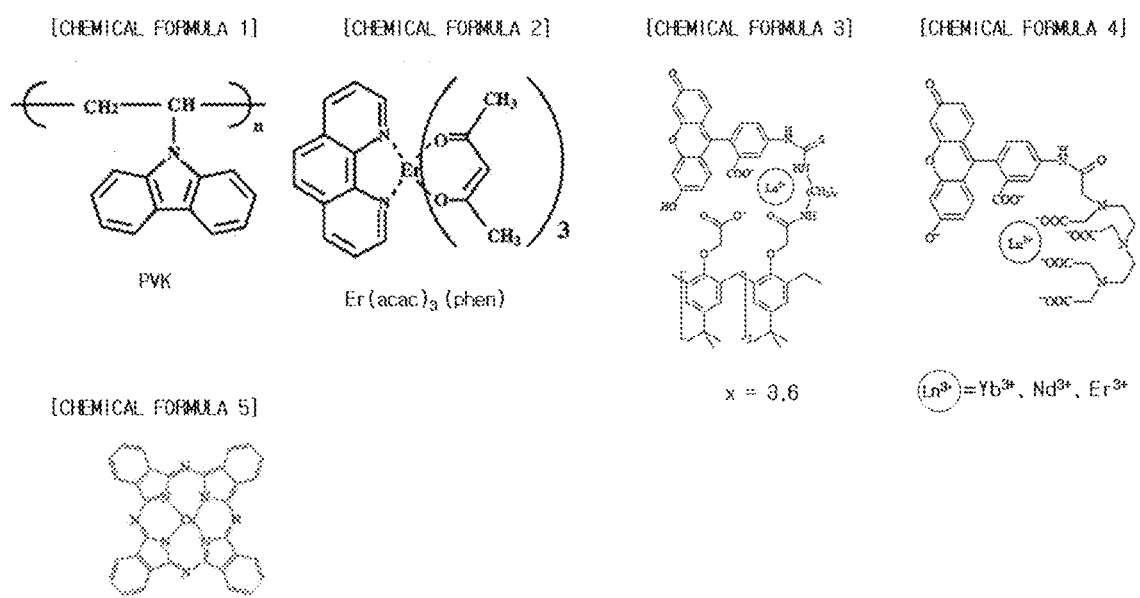

DISPLAY APPARATUS

This application claims the benefit of Korean Patent Application No. 10-2020-0144527 filed on Nov. 2, 2020, the entire contents of which is incorporated herein by reference for all purposes as if fully set forth herein.

BACKGROUND

Field

The present disclosure relates to a display apparatus and more particularly to a display apparatus having new type touch sensing elements that emit near-infrared for sensing a touch.

Description of the Related Art

As the information age is in progress recently, a field of display technology that visually displays electrical information signals has developed rapidly, and in response to this, various display apparatuses with excellent performance of becoming thinner and lighter and of consuming lower power are being developed.

Specific examples of such a display apparatus include a liquid crystal display apparatus (LCD), an organic light emitting display apparatus (OLED), a quantum dot display apparatus, and the like.

The display apparatus may include a display panel and a plurality of components for providing various functions. For example, in an existing display apparatus, a film-type touch panel is disposed on the display panel, or separate sensors for fingerprint recognition are generalized, such that they occupy a rear side or some space of the display panel so that they have an absolutely required function to input desired commands that a user want through a screen of the display apparatus or to perform a function of user recognition.

For the normal operation of the functions of the touch panel or fingerprint sensor, various wirings and processors had to be arranged in the display apparatus. Such a touch screen integrated display apparatus has a problem that its thickness increases.

As the performance of the display apparatus is advanced and of the display apparatus becomes smaller, the simplification of the display apparatus has become an important issue in a product design. Since so-called lightweight and thinning has become a major topic in the product design, a configuration which can replace the touch panel or fingerprint sensor is required for extreme space saving.

SUMMARY

Embodiments of the present disclosure are provided to solve the aforementioned problems. The purpose of the present disclosure is to reduce a space for arranging a touch panel and fingerprint recognition sensors in smart devices. First, when a separate panel is generally added as a part of the display apparatus on the display panel and a user performs a series of commands on the touch panel in the form of a touch, the touch panel recognizes this, and thus, makes a separate keyboard or mouse unnecessary. Such a touch panel has been developed to be indispensably applied to portable, mobile, or wearable device. However, as the display apparatuses are gradually advanced, research has been continuously devoted to a method for reducing the volume and weight of the touch panel. A method in which a touch panel is disposed within the display apparatus instead of a separate touch panel disposed on the display apparatus has been continuously researched and developed. Also, fingerprint recognition sensors have been continuously developed for the security of the display apparatus. For example, when the display apparatus is in a locked-state, the display apparatus can be converted to an open state by recognizing a fingerprint of the user. Such a fingerprint recognition can be in various ways, for example, not only the conversion from the locked-state to the open state in the display apparatus but also final confirmation of mobile payment or command execution, etc., so that the fingerprint recognition has been developed as an essential function. For the purpose of the fingerprint recognition, separate ultrasonic or infrared sensors can be disposed on the display apparatus, and generally, are disposed on the back of the display panel, that is, the opposite side of the screen with respect to the user, so that a space for batteries or communication can be limited. When the sensors for the touch panel or fingerprint recognition are disposed within the display panel by using existing structures, the display apparatus can be lightweight and thinner.

The display panel of the organic light emitting display apparatus has an RGB method in which a subpixel emits directly red light, green light, and blue light or has a WRGB method in which the subpixel emits white light and each subpixel has red, green, and blue color filters.

In each of the RGB method and the WRGB method, when the subpixel emits light, the light leaks to regions of adjacent pixels so that color mixing may occur. In particular, in the case of the WRGB, the light leaks to regions of adjacent subpixels, so that color mixing may be very likely to occur through color filters. There may be a need to add structures for absorbing such leaking light. Invisible light having a different wavelength emits by absorbing the leaking light, so that there may be an effect of preventing color mixing with adjacent subpixels.

One embodiment is a display apparatus including: a panel which includes a light emitting area and at least one non-light emitting area; a light emitting device disposed in the light emitting area and a light converter disposed in the non-light emitting area; and a capping layer disposed on a second electrode. The light emitting device may include a first electrode, a light emitting stack, and the second electrode. The light converter may include a light conversion layer and a light amplification layer. The light converter may include a light conversion material.

Another embodiment is a display apparatus including: a substrate: a transistor disposed on the substrate; an organic light emitting diode disposed on the transistor; a capping layer disposed on the organic light emitting diode; an encapsulation part disposed on the capping layer; a cover glass disposed on the encapsulation part; and a near-infrared converter which is disposed to surround the organic light emitting diode. The organic light emitting diode may include a first electrode, a light emitting stack, and a second electrode. The near-infrared converter may include a light conversion layer and a light amplifier. The capping layer may extend to a top of the light conversion layer.

Other details of the embodiments are included in the detailed description and drawings.

According to the embodiment, a panel array includes a light conversion structure which converts visible light into near-infrared. The panel array includes a near-infrared light receiver which detects reflected light of the converted near-infrared. Since there is no need to provide a touch panel part including a touch electrode, a touch line, a routing line, and a touch pad, a manufacturing process of the display apparatus can become simpler. Since the touch panel part is not provided, a process cost of the display apparatus can be significantly reduced.

Also, in a conventional display apparatus, in order to prevent touch sensitivity reduction due to parasitic capacitance between the touch electrode and the second electrode, the thickness of the encapsulation part must be designed to be equal to or greater than several microns or more. However, since the organic light emitting diode according to the embodiment of the present disclosure does not include a touch panel including the touch electrode, the thickness of the display apparatus can be reduced.

Also, in order to obtain information on the touch, the organic light emitting diode according to the embodiment of the present disclosure is able to not only maintain the light emission of the display apparatus but also detect the touch at the same time, without a troublesome operation to turn off the light emission of the display apparatus.

Also, the display apparatus according to the embodiment of the present disclosure is able to not only minimize a visual sensation effect by using the light with the near-infrared wavelength that humans cannot perceive but also detect the reflected or scattered light with the near-infrared wavelength by means of the near-infrared light receiver which has the same structure and configuration as those of a transistor used for the emission of the organic light emitting diode.

Additionally, since the near-infrared has a greater wavelength than that of visible light, the near-infrared is less scattered or reflected than the visible light, it is advantageous to obtain depth information on an image such as an iris, a retina, or the like.

According to the embodiment, a panel array includes a light conversion structure which converts visible light into near-infrared. The panel array includes a near-infrared light receiver which detects reflected light of the converted near-infrared. Therefore, there is no need to provide a fingerprint recognizer which includes a fingerprint sensor, an attachment structure for the fingerprint sensor, and wiring arrangement, a manufacturing process of the display apparatus can become simpler. Since the fingerprint recognizer is not provided, a process cost of the display apparatus can be significantly reduced.

Advantageous effects that can be obtained from the present disclosure are not limited to the above-mentioned effects. Further, other unmentioned effects can be clearly understood from the following descriptions by those skilled in the art to which the present disclosure belongs.

Since the foregoing contents of the present disclosure described in the technical problems, the technical solutions, and advantageous effects do not specify the essential characteristics of the claims, the scope of the claims is not limited by the matters described in the contents of the present disclosure.

BRIEF DESCRIPTION OF THE DRAWINGS

FIG. 1 shows an entire surface of a display panel according to an embodiment of the present disclosure;

FIGS. 2A to 2B are plan views showing a pixel area of an active area by enlarging a part "A" of FIG. 1;

FIG. 3 is a cross sectional view of a subpixel taken along line I-I' of FIGS. 2A to 2B;

FIG. 4 is a cross sectional view showing light conversion of a near-infrared converter by enlarging a part "B" of FIG. 3;

FIG. 5 is a graph showing a spectrum change in which visible light incident on the near-infrared converter is converted into near-infrared and is emitted;

FIGS. 6A to 6B show a simulation result obtained by performing an experiment of visible light emission and near-infrared conversion by virtually configuring a cross-section of the subpixel;

FIG. 7 shows a process in which, when a touch occurs on a surface of the display apparatus by a finger in the structure of FIG. 3, the near-infrared is collected in a near-infrared light receiver and the touch is sensed;

FIG. 8 is a mimetic diagram showing thickness control for a resonance design in the near-infrared converter and the near-infrared light receiver; and FIG. 9 shows chemical formulas of light conversion materials which can be used for the near-infrared converter.

DETAILED DESCRIPTION

The features, advantages and method for accomplishment of the present disclosure will be more apparent from referring to the following detailed embodiments described as well as the accompanying drawings. However, the present disclosure is not limited to the embodiment to be disclosed below and is implemented in different and various forms. The embodiments bring about the complete disclosure of the present disclosure and are only provided to make those skilled in the art fully understand the scope of the present disclosure. The present disclosure is just defined by the scope of the appended claims.

Since the shapes, sizes, proportions, angles, numbers, etc., disclosed in the drawings for describing the embodiments of the present disclosure are illustrative, the present disclosure is not limited to the shown details. The same reference numerals throughout the disclosure correspond to the same elements. Also, throughout the description of the present disclosure, the detailed description of known technologies incorporated herein will be omitted when it may make the subject matter of the present disclosure unclear. Terms such as "includes", "has", "composed", etc., mentioned in the present disclosure are used, other parts can be added unless a term "only" is used. A component represented in a singular form includes the expression of plural form thereof unless otherwise explicitly mentioned.

In construing components, error ranges are construed as being included even unless otherwise explicitly mentioned.

In describing positional relationships, when the positional relationship of two parts is described, for example, "on", "over", "under", "next to", etc., one or more other parts may be positioned between the two parts as long as a term "directly" or "immediately" is not used.

With regard to descriptions related to time relation, for example, when time anterior and posterior relationship such as "after", "subsequent to", "next", "before", etc., is described, non-continuous cases can also be included unless "immediately" or "directly" is used.

While terms such as the first and the second, etc., can be used to describe various components, the components are not limited by the terms mentioned above. The terms are used only for distinguishing between one component and other components. Therefore, the first component to be described below may be the second component within the spirit of the present disclosure.

In describing the components of the present disclosure, terms such as the first, the second, A, B, (a), (b), etc., can be used. Such terms are used only to distinguish one component from other components, and the essence, order, or number, etc., of the component are not limited by the terms. When it is said that a component is "connected", "coupled" or "accessed" to another component, it should be understood that not only the component may be directly connected or accessed to that other component, but also another component may be "interposed" between respective components or each component may be "connected", "coupled", or "accessed" by other components.

In the present specification, "display apparatus" may include a display apparatus in a narrow sense such as a liquid crystal module (LCM) including a display panel and a driving unit for driving the display panel, an organic light emitting module (OLED Module), and a quantum dot module. Also, the display apparatus may include a laptop computer, televisions, and computer monitors, which are a complete product or a final product including the LCM, the OLED module, the QD module, etc., an equipment display which includes an automotive display or other types of vehicles, and a set electronic device, a set device or set apparatus such as a mobile electronic device, for example, a smart phone, an electronic pad, or the like.

Accordingly, the display apparatus in the present specification may include the display apparatus itself in a narrow sense such as the LCM, the OLED module, the QD module, etc., and a set device that is an end-user device or an application product which includes the LCM, the OLED module, the QD module, etc.

Also, in some cases, the LCM, the OLED module, and the QD module which include the display panel and the driving unit may be represented as a "display apparatus" in a narrow sense, and an electronic device as a complete product including the LCM, the OLED module, and the QD module may also be represented as a "set device" in distinction from the "display apparatus". For example, the display apparatus in a narrow sense may include a liquid crystal display (LCD) panel, an organic light emitting display (OLED) panel or a quantum dot display panel, and a source PCB that is a controller for driving the display panel, and the set device may further include a set PCB which is a set controller that is electrically connected to the source PCB and control the entire set device.

All types of display panels such as a liquid crystal display panel, an organic light emitting diode (OLED) display panel, a quantum dot (QD) display panel, an electroluminescent display panel, etc., can be used as the display panel used in this embodiment. Also, the shape or size of the display panel used in the display apparatus according to the embodiment of the present specification is not limited.

More specifically, when the display panel is an organic light emitting diode (OLED) display panel, the display panel may include a plurality of gate lines and data lines, and pixels formed at intersections of the gate lines and the data lines. Also, the display panel may include an array including a thin film transistor for selectively applying a voltage to each pixel, an organic light emitting device (OLED) layer on the array, and an encapsulation substrate or an encapsulation layer, etc., disposed on the array to cover the organic light emitting device layer. The encapsulation layer can protect the thin film transistor, the organic light emitting device layer, etc., from external impact, and can prevent penetration of moisture or oxygen into the organic light emitting device layer. Also, the layer formed on the array may include an inorganic light emitting layer, for example, a nano-sized material layer or quantum dots, etc.

FIG. 1 shows an exemplary organic light emitting diode (OLED) display panel 100 which may be incorporated into display apparatuses.

Referring to FIG. 1, the organic light emitting display panel 100 may include an active area AA and a non-active area NA around the active area AA. Subpixels for emitting light may be disposed in the active area AA, and a gate driver GIP for the subpixels to emit light may be disposed in the non-active area NA. Also, various signal wirings, a data driver, and a pad PAD may be disposed on the organic light emitting display panel 100.

FIGS. 2A to 2B show enlarged part "A" which is a portion of the active area AA of the display panel 100 of FIG. 1, and show planar shapes of subpixels disposed in the active area A.

Referring to FIG. 2A, a plurality of subpixels 501, 502, 503, and 504 is disposed in the active area AA, and transistors 120 for driving the subpixels are disposed. Referring to FIG. 2A, with regard to the plurality of subpixels, a red subpixel 501, a white subpixel 504, a green subpixel 502, and a blue subpixel 503 may be sequentially arranged at regular intervals. The transistors 120 for driving the subpixel may be disposed at one end of the subpixels, respectively, and this subpixel arrangement may be referred to as a WRGB type. In the case of the WRGB type, a near-infrared converter 174 may be disposed between the subpixel and the subpixel, and a near-infrared (NIR) light receiver 160 may be disposed near the transistor 120. While the near-infrared converter 174 is disposed on the transistor 120, the near-infrared converter 174 may be removed near the near-infrared light receiver 160 (see FIG. 3).

Referring to FIG. 2B, the subpixels may have an octagonal or circular shape, and a red subpixel 501, a green subpixel 502, a blue subpixel 503, and a second red subpixel 501' may be arranged to form a rhombus shape or a quadrangular shape with respect to a central point. Such an arrangement of the subpixels may be referred to as a pentile type. Although the second red subpixel 501' is disposed in FIG. 2B, the green subpixel can be additionally disposed instead of the red subpixel. Although transistors for driving each subpixel are shown in FIG. 2A, the transistors are omitted in FIG. 2B. a top surface emitting type is applied to the pentile type display apparatus, so that transistors may be disposed under the subpixels. These transistors may not be visible by being blocked by an anode constituting the subpixel when the transistors are viewed from the top of the display apparatus. Each subpixel may include the anode, and an organic luminescent material may be filled in an anode region for each subpixel. Here, the light converter 174 may be disposed to cover the corner of the anode, and only the middle region of the anode is in contact with an organic light emitting stack so that the light converter 174 functions to define a light emitting area of the subpixel. A column spacer may be disposed in a portion of the region where the light converter 174 is disposed. The column spacer may be disposed to have a constant density in the entire display panel 100. When a deposition process is performed to form the organic light emitting stack, the column spacer serves to support a mask which covers or opens a position where an organic layer is to be disposed for each subpixel, such that the mask does not directly contact the display panel 100. The near-infrared light receiver 160 may be disposed between the subpixel and the subpixel, and the light converter 174 may be removed at a position where the near-infrared light receiver 160 is disposed.

FIG. 3 shows a cross-sectional structure of the subpixel taken along line I-I' of FIG. 2A.

The organic light emitting diode display 100 according to the present disclosure displays an image through a unit pixel including an organic light emitting diode 130.

Each of a plurality of the subpixels includes a pixel driving circuit and the organic light emitting diode 130 connected to the pixel driving circuit. The pixel driving circuit includes a switching transistor, a driving transistor, and a storage capacitor. Also, the pixel driving circuit may include three or more transistors and one or more capacitors.

When a scan signal is supplied to a scan line, the switching transistor is turned on and supplies a data signal supplied to the data line to a gate electrode of the driving transistor and the storage capacitor.

The driving transistor controls the amount of light emission of the organic light emitting diode 130 by controlling a current supplied from a high voltage (VDD) supply line to the organic light emitting diode 130 in response to a data signal supplied to the gate electrode. Also, even when the switching transistor is turned off, the driving transistor supplies a constant current by a voltage charged in the storage capacitor until a data signal of the next frame is supplied, so that the organic light emitting diode 130 maintains light emission.

Referring to FIG. 3, a substrate 110 and a multi-buffer layer 111 may be provided. The driving transistor 120 may include a semiconductor layer 124 disposed on the multi-buffer layer 111, a gate insulating layer 112 for insulation from a gate electrode 122, and source and drain electrodes 126 and 128 which are formed on a lower interlayer insulating layer 113 and the gate electrode 112 and come in contact with the semiconductor layer 124. The lower interlayer insulating layer 113 may be disposed on the gate electrode 122. Here, the semiconductor layer 124 may be formed of at least one of an amorphous semiconductor material, a polycrystalline semiconductor material, and an oxide semiconductor material.

The multi-buffer layer 111 can delay the diffusion of moisture or oxygen penetrating into the substrate 110 and may be formed by alternately stacking silicon nitride (SiNx) and silicon oxide (SiOx) at least once.

The semiconductor layer 124 of the driving transistor 120 may be formed of a polycrystalline semiconductor layer, and the semiconductor layer 124 may include a channel region, a source region, and a drain region.

Since the polycrystalline semiconductor material has a higher mobility than those of the amorphous semiconductor material and the oxide semiconductor material, the polycrystalline semiconductor material has low energy consumption and excellent reliability. Due to these advantages, the polycrystalline semiconductor layer may be used in the driving transistor 120.

The gate electrode 122 may be disposed on the gate insulating layer 112 and may be disposed to overlap the semiconductor layer 124.

The gate electrode 122 may be formed as a single layer or multiple layers made of any one of molybdenum (Mo), aluminum (Al), chromium (Cr), gold (Au), titanium (Ti), nickel (Ni), neodymium (Nd), and copper (Cu) or an alloy thereof, and is not limited thereto.

The source and drain electrodes 126 and 128 may be formed as a single layer or multiple layers made of any one of molybdenum (Mo), aluminum (Al), chromium (Cr), gold (Au), titanium (Ti), nickel (Ni), neodymium (Nd), and copper (Cu) or an alloy thereof, and is not limited thereto.

An upper interlayer insulating layer 114 and a planarization layer 115 may be disposed on the lower interlayer insulating layer 113 and the source and drain electrodes 126 and 128. The upper interlayer insulating layer 114 may be formed of silicon nitride (SiNx) or silicon oxide (SiOx), and the planarization layer 115 may be formed of photo acryl or an organic material. A through-hole may be formed in the upper interlayer insulating layer 114 and the planarization layer 115, and a first electrode 132 electrically connected to the drain electrode 128 exposed through the through-hole may be disposed.

The organic light emitting diode 130 includes the first electrode 132, a light emitting stack 134 formed on the first electrode 132, and a second electrode 136 formed on the light emitting stack 134.

The NIR converter 174 may be disposed to cover the outer portion of the first electrode 132, and an opening may be formed in the center of the first electrode 132.

The NIR converter 174 disposed at the outer portion of the first electrode 132 may have a matrix-shaped plane.

The light emitting stacks 134 of the organic light emitting diode 130 may be in contact with the first electrode 132 in the opening partitioned by the NIR converter 174. The light emitting stack 134 may be formed by stacking a hole related layer, an organic light emitting layer, and an electron related layer on the first electrode 132 in the order listed or in the reverse order thereof, and the light emitting stack 134 may include first, second and third light emitting stacks which are opposite to each other with a charge generation layer interposed therebetween. In this case, the organic light emitting layer of any one of the second and third light emitting stacks generates blue light, and the organic light emitting layer of the other of the second and third light emitting stacks generates yellowish green light, so that white light can be generated through the second and third light emitting stacks. In this specification, although it has been described that the light emitting stack 134 has a tandem structure, an RGB individual light emission type can be applied without limiting thereto.

Since white light generated from the light emitting stack 134 is incident on a color filter 150 positioned above or below the light emitting stack 134, a color image can be formed. The second electrode 136 is disposed to face the first electrode 132 with the light emitting stack 134 interposed therebetween and is connected to a low voltage (VSS) supply line.

For the purpose of protecting the organic layers and electrodes below the second electrode 136, for increasing a light extraction efficiency or for color correction, a capping layer 118 may be included on the second electrode 136. The capping layer 118 may be formed of any one of host materials of an electron transport layer and a hole transport layer to be described below.

An encapsulation part 140 minimizes the penetration of external moisture or oxygen into the organic light emitting diode 130 positioned within the encapsulation part 140. To this end, the encapsulation part 140 may include encapsulation layers such as first and second inorganic layers 142 and 146 or an organic layer 144.

The first inorganic layer 142 is formed on the organic light emitting diode 130, and the first inorganic layer 142 is formed of an inorganic insulating material which can be deposited at a low temperature, such as silicon nitride (SiNx), silicon oxide (SiOx), silicon oxynitride (SiON), or aluminum oxide (Al2O3). Accordingly, since the first inorganic layer 142 is deposited in a low temperature atmosphere, it is possible to minimize the damage to the light emitting stack 134 which is vulnerable to a high temperature atmosphere during the deposition process of the first inorganic layer 142.

The organic layer 144 serves as a buffer for reducing a stress between the respective layers according to the bending of the organic light emitting display apparatus, and enhances a planarization performance. Also, the organic layer 144 covers foreign materials (particles) that may be introduced while the first inorganic layer 142 is formed, and accordingly, the second inorganic layer 146 is uniformly formed on the first inorganic layer 142 and the organic layer 144. Therefore, the encapsulation function of the encapsulation part 140 can be further improved.

The organic layer 144 is formed of an organic insulating material such as acrylic resin, epoxy resin, polyimide, polyethylene, or silicon oxycarbon (SiOC). The organic layer 144 may be formed to have a uniform thickness within the active area or to have a thickness which reduces from the center to the edge of the active area.

The second inorganic layer 146 is formed on the first inorganic layer 142 on which the organic layer 144 is formed. The second inorganic layer 146 covers the top and side surfaces of the organic layer 144 and the first inorganic layer 142, respectively. Accordingly, the second inorganic layer 146 minimizes or blocks the penetration of external moisture or oxygen into the first inorganic layer 142 and the organic layer 144. The second inorganic layer 146 is formed of an inorganic insulating material such as silicon nitride (SiNx), silicon oxide (SiOx), silicon oxynitride (SiON), or aluminum oxide (Al2O3).

The color filter 150 is formed on the encapsulation part 140, and a blocking layer 154 is disposed between the color filters 150. The blocking layer 154 serves to separate each subpixel area and prevent optical interference and light leakage between adjacent subpixel areas. The blocking layer 154 may be formed of a high-resistance black insulating material.

Also, an optical clear layer (OC) 152 and a cover glass may be formed on the color filter 150 and the blocking layer 154. The substrate 110 on which the color filter 150 and the blocking layer 154 are formed can be planarized by the optical clear layer 152.

The near-infrared light receiver 160 is disposed on the same plane as the transistor for light emission of the organic light emitting diode 130 and is manufactured to have the same configuration in the same process, so that an additional process for manufacturing the near-infrared light receiver 160 is not required.

In another embodiment, the near-infrared light receiver 160 may include a near-infrared light receiving layer 161 which receives light having a near-infrared (NIR) wavelength and may include transmissive electrodes 163 and 164 and a reflective electrode 162 on and under the near-infrared light receiving layer 161, respectively.

The reflective electrode 162 prevents the incident light from being transmitted and lost. The reflective electrode 162 may be formed of the same material as that of the above-described gate electrode 122 or the first electrode 132. The transmissive electrode 163 may be a transmissive electrode for absorbing as much near-infrared (NIR) as possible and may be formed of ITO, IZO, AITO, carbon nanotubes, graphene, or silver nanoparticles.

The near-infrared light receiver 160 may be formed of a material suitable for receiving light having a near-infrared (NIR) wavelength, and specifically, may be formed by using any one selected from the group consisting of metal phthalocyanine, metal bisdithiolene, and squaraine.

The near-infrared converter 174 according to the embodiment of the present disclosure can replace a bank which functions to partition the light emitting area of the pixel, and can convert the white light or colored light emitted from the organic light emitting diode 130 into near-infrared (NIR) light. A near-infrared amplifier 172 may be disposed below the near-infrared converter 174. The near-infrared amplifier 172 may be disposed apart from the near-infrared converter 174 by a certain distance and may amplify the near-infrared (NIR) obtained by converting the white light or colored light emitted from the organic light emitting diode 130. Also, there may be no need to provide a touch panel which includes not only the organic light emitting diode 130 converting the white light or colored light into the near-infrared (NIR) light and the near-infrared light receiver 160 receiving the near-infrared (NIR) light, but also a touch electrode, a touch line, a routing line, and a touch pad. Further, there may be no need to provide a fingerprint sensor for fingerprint recognition, an adhesive, and wiring under the display panel 100.

FIG. 4 is a cross sectional view showing a part "B" of FIG. 3 according to the embodiment of the present disclosure.

Referring to FIG. 4, when white light W emitted from the organic light emitting diode 130 is incident on the near-infrared conversion layer 174, the near-infrared (NIR) may be emitted by a light conversion material within the near-infrared conversion layer 174. The near-infrared (NIR) emitted from the near-infrared conversion layer 174 may be emitted upward from the near-infrared conversion layer 174, and may be emitted to the near-infrared amplifier 172 below the near-infrared conversion layer 174.

The planarization layer 115 may be provided between the near-infrared conversion layer 174 and the near-infrared amplifier 172 and may be provided to maintain a constant distance between the near-infrared conversion layer 174 and the near-infrared amplifier 172.

The near-infrared amplifier 172 may reflect the near-infrared (NIR) emitted from the near-infrared conversion layer 174. The near-infrared amplifier 172 may be formed of the same material as that of the above-described first electrode 132 such that the incident light is not transmitted. However, the near-infrared amplifier 172 is not limited thereto.

The second electrode 136 and the capping layer 118, which are parts of the organic light emitting diode 130, may be disposed on the near-infrared conversion layer 174, and the near-infrared (NIR) emitted from the near-infrared conversion layer 174 may be partially reflected to the near-infrared amplifier 172 by the reflectance and refractive index of the second electrode 136 and the capping layer 118. When the near-infrared (NIR) reflected from the second electrode 136 or the capping layer 118 and the near-infrared (NIR) reflected from the near-infrared amplifier 172 meet in the vicinity of the near-infrared conversion layer 174, amplification may occur. For the purpose of the amplification of the near-infrared (NIR), a resonance design for controlling the thickness of the planarization layer 115 placed between the near-infrared conversion layer 174 and the near-infrared amplifier 172 can be applied.

When the white light W is absorbed by the near-infrared conversion layer 174, the white light W may not propagate to other adjacent subpixels, and the effect that other subpixels emit light is prevented to reduce color mixing.

FIG. 5 is a graph showing a spectrum of light emitted from the display apparatus according to the present disclosure. Referring to FIG. 5, regarding the white light emitted from the display apparatus according to the embodiment of the present disclosure, it can be seen that the white light emitted from the organic light emitting diode 130 has a wavelength of about 380 nm to about 700 nm, and the white light is converted into the near-infrared (NIR) having a wavelength of about 780 nm to about 990 nm by the near-infrared conversion layer 174.

FIGS. 6A to 6B show a simulation result obtained by performing an optical simulation of the organic light emitting diode 130 and the near-infrared conversion layer 174 according to the embodiment of the present disclosure. The optical simulation utilizes computer programming to form a virtual 2D or 3D structure and to charge the properties of each structure, thereby observing optical phenomenon that may occur during the operation of the product even in the absence of an actual product and reflecting the experimental results in the product design. This method is being widely used.

Referring to FIGS. 6A to 6B, the first electrode 132, the light emitting stack 134, and the second electrode 136 which constitute the near-infrared conversion layer 174 and the organic light emitting diode 130 is disposed in a virtual 2D space. The first and second inorganic layers 142 and 146 or the organic layer 144 which constitute the encapsulation layer 140 are disposed on the organic light emitting diode 130. The color filter 150 may be disposed on the encapsulation layer 140.

FIG. 6A shows that the organic light emitting diode 130 starts to emit light and emits the white light. Here, it can be seen that most of the white light is spread upward, that is, toward the color filter 150, however, a part of the white light is spread laterally. Also, it can be found that light refraction occurs at the interface between the second inorganic layer 146 and the color filter 150 which are disposed on the organic light emitting diode 130 and the refracted light comes down to the near-infrared converter 174.

FIG. 6B shows a part of the white light emitted from the organic light emitting diode 130, which is spread laterally, and the light which is refracted at the interface between the second inorganic layer 146 and the color filter 150 and is absorbed by the near-infrared conversion layer 174 are converted, and thus, the near-infrared (NIR) is emitted. color filter 150, Here, the near-infrared (NIR) has a wavelength having a much smaller width than that of the white light and it can be seen that the near-infrared (NIR) is emitted upward, that is, toward the color filter 150. The emission width of the near-infrared (NIR) emitted from the near-infrared conversion layer 174 may be less than the that of the near-infrared conversion layer 174 on the top surface of the near-infrared conversion layer 174. The width of the near-infrared (NIR) may be greater than the width of the near-infrared conversion layer 174 the closer it is to the color filter 150. Compared to the white light emitted from the organic light emitting diode 130, the near-infrared (NIR) emitted from the near-infrared conversion layer 174 has a feature that it has an improved straightness toward the color filter 150. This is due to the effect of the amplification by the near-infrared amplifier 172 mentioned in FIG. 4, and the waveform output due to constructive interference by resonance (micro-cavity) is reduced, and thus, straightness can be improved.

FIG. 7 is a cross sectional view showing that a touch is sensed in the display apparatus according to the embodiment of the present disclosure.

Referring to FIG. 7, when a finger is placed on the organic light emitting display apparatus according to the embodiment of the present disclosure, the near-infrared (NIR) emitted from the organic light emitting diode is irradiated to the finger, and the light with the near-infrared (NIR) wavelength has a wavelength other than the wavelength of visible light. Accordingly, a person cannot recognize the light with the near-infrared (NIR) wavelength, so that reflected or scattered light with the near-infrared (NIR) wavelength may be received by the near-infrared light receiver 160 and detected while minimizing a visual sensation effect.

In the near-infrared light receiver 160, in order for the near-infrared (NIR) to be smoothly received, the planarization layer 115 and the near-infrared converter 174 which exist in the adjacent organic light emitting diode 130 region can be removed. The planarization layer 115 and the near-infrared converter 174 on the region where the near-infrared light receiver 160 is disposed are removed because it is possible to minimize a phenomenon in which the near-infrared (NIR) is refracted or scattered by refractive indices of the planarization layer 115 and the near-infrared converter 174 so that the light is not received by the near-infrared light receiver 160.

When a user touches the display apparatus, the near-infrared (NIR) which is being generated by the closest near-infrared converter 174 is reflected and proceeds to the inside of the display panel 100, a part of which may be incident on the adjacent near-infrared light receiver 160. The incident near-infrared (NIR) reaches the light absorption layer 161 of the near-infrared light receiver 160, and a photoelectric effect may occur in the light absorption layer 161 by the near-infrared (NIR) absorbed by the light absorption layer 161.

The photoelectric effect is a phenomenon that occurs due to the particle nature among the wave nature and particle nature of light, and means that electrons are emitted from metal when light is applied to the metal. Electrons emitted from the metal are called photoelectrons, and a phenomenon in which a voltage is changed in the metal due to the emission of electrons and current flows in the metal by the voltage change is referred to as the photoelectric effect. The photoelectric effect is being applied in various ways in real life, in particular, in an automatic door or indoor lighting that checks the existence of an object by using an infrared sensor. Through such a photoelectric effect, a flow of current in the light absorption layer 161 is sensed thereby sensing that a nearby region of the light absorption layer 161 is touched.

The foregoing description has described only the touch of a finger, and the display apparatus can be applied to a fingerprint, an iris, a retina, a face, or the like. In particular, since the near-infrared (NIR) has a greater wavelength than that of visible light, the near-infrared (NIR) is less scattered or reflected than the visible light, it is advantageous to obtain depth information on an image such as a fingerprint, an iris, a retina, a face, or the like.

The display apparatus according to the embodiment of the present disclosure is able to maximize a resonance effect (constructive interference, indicated by an asterisk in the drawing) through thickness control between the near-infrared amplifier 172 and the second electrode 136 or between the near-infrared amplifier 172 and the capping layer 118 provided on the second electrode 136, so that the emitted near-infrared (NIR) is more collected in the near-infrared light receiver 160 and a sensing performance of the touch can be improved.

Additionally, so as to obtain the information on the touch, the display apparatus according to the embodiment of the present disclosure is able to sense the touch simultaneously with the maintenance of the light emission of the display apparatus without a troublesome operation to turn off the light emission of the display apparatus.

FIG. 8 is a mimetic diagram showing thickness control for resonance design in the display apparatus according to the embodiment of the present disclosure.

The display apparatus according to embodiment of the present disclosure shows in which form the wavelength of the near-infrared (NIR) generated by converting the white light emitted from the organic light emitting diode 130 in the near-infrared conversion layer 174 resonates. A part of the converted near-infrared (NIR) is emitted upward but may be reflected by the second electrode 136 and the capping layer 118 which are disposed on the near-infrared conversion layer 174 or may be reflected at the interface between the second electrode 136 and the capping layer 118. Some of the converted near-infrared (NIR) is emitted from below the near-infrared converter 174 and may be reflected by the near-infrared amplifier 172. When the near-infrared (NIR) reflected by the second electrode 136 and the capping layer 118 or reflected at the interface between the second electrode 136 and the capping layer 118 meets the near-infrared (NIR) reflected by the near-infrared amplifier 172, constructive interference may occur. Also, the near-infrared (NIR) reflected by the touch by a finger may also resonate in the near-infrared light receiver 160. The reflected near-infrared (NIR) is partially absorbed by the light absorption layer 161 of the near-infrared light receiver 160 and is secondarily reflected, and then may be tertiary reflected by the second electrode 136 and the capping layer 118 or tertiary reflected at the interface between the second electrode 136 and the capping layer 118. Constructive interference may occur when the secondarily reflected near-infrared (NIR) and the tertiary reflected near-infrared (NIR) meet. Due to the constructive interference near the near-infrared conversion layer 174, the near-infrared (NIR) which is emitted in order to sense the touch becomes stronger, and the accuracy of sensing the touch can be improved due to the constructive interference in the near-infrared light receiver 160.

$$\text{Thickness}_{TR} = m \frac{n_{TR} \lambda_{NIR}}{2} \quad \text{Equation (1)}$$

Here, "ThicknessTR" may represent a thickness from the top of the near-infrared amplifier 172 to the bottom of the second electrode 136 or to the bottom of the capping layer 118 and a thickness from the top of the light absorption layer 161 to the bottom of the second electrode 136 or to the bottom of the capping layer 118. "nTR" represents a refractive index from the top of the near-infrared amplifier 172 to the bottom of the second electrode 136 or to the bottom of the capping layer 118 and a refractive index from the top of the light absorption layer 161 to the bottom of the second electrode 136 or to the bottom of the capping layer 118, that is to say, a refractive index of transparent layers provided in a section where the resonance occurs. "λNIR" represents the wavelength of near-infrared (NIR), and "m" is a natural number from 1 to 5 as a resonance order.

For example, assuming that "m" is 1, and assuming that the refractive index "nTR" of the transparent layers from the top of the near-infrared amplifier 172 to the bottom of the second electrode 136 or to the bottom of the capping layer 118 is 1.7, and assuming that the wavelength of the near-infrared (NIR) is 1,500 nm, the thickness is 1.275 µm (1,275 nm) according to Equation 1 above. If a distance from the top of the near-infrared amplifier 172 to the bottom of the second electrode 136 or to the bottom of the capping layer 118 is designed to be 1.275 µm, the resonance effect of the wavelength of the near-infrared (NIR) can be maximized, and a large amount of the near-infrared (NIR) is received at the top of the near-infrared light receiver 160, so that the sensing of the near-infrared (NIR) can be improved.

Accordingly, in the display apparatus according to the embodiment of the present disclosure, the thickness from the top of the near-infrared amplifier 172 to the bottom of the second electrode 136 or to the bottom of the capping layer 118 may be in the range of 1.275 µm to 6.375 µm, specifically, when m=1, the thickness may be 1.275 µm, when m=2, the thickness may be 2.550 µm, when m=3, the thickness may be 3.825 µm, when m=4, the thickness may be 5.100 µm, and when m=5, the thickness may be 6.375 µm.

Meanwhile, as described above, the encapsulation part 140 for protecting the organic light emitting diode 130 as well as for controlling the thickness from the near-infrared amplifier 172 to the second electrode 136 or to the capping layer 118 can be used as an organic material in a resonance area for sensing the near-infrared (NIR).

Specifically, the thickness described above is not dependent on the area of the organic light emitting diode 130, and the thickness of the encapsulation part 140 can also be utilized. The thickness can be varied depending on the change in flatness characteristics of a material constituting the encapsulation part 140 and the design (e.g., change in the mask stack, height adjustment through dry etching or wet etching) of the substrate (including the passivation layer (PAS layer) in the area under the organic light emitting diode.

Also, in a conventional display apparatus having a touch panel part, in order to prevent parasitic capacitance between the touch electrode and the second electrode 136, the thickness of the encapsulation part 140 must be maintained to be equal to or greater than several microns or more (5 µm). However, in the present disclosure, since the touch panel including the touch electrode is not provided, the thickness of the display apparatus can be further reduced.

FIG. 9 shows chemical formulas of materials which can be applied to the near-infrared conversion layer 174.

Referring to FIG. 9, a Chemical Formula 1 shows a material obtained by doping a polymer matrix of poly-N-vinylcarbazole with a lanthanum complex and a multinuclear metal complex. Here, n is an integer of 1 or more.

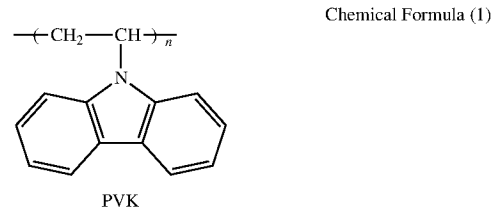

Chemical Formula (1)

PVK

A Chemical Formula 2 shows a lanthanum complex which may be tris(acetylacetonate)(monophenanthroline)erbium (Er(acac)3(phen)) below.

Chemical Formula (2)

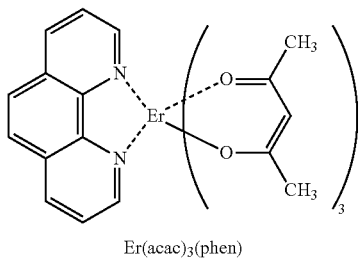

Er(acac)₃(phen)

Another lanthanide complex may be shown in a Chemical Formula 3 or the following Chemical Formula 4. In the Chemical Formula 3, x is 3 or 6, and La3+ is any one selected from the group consisting of Yb3+, Nd3+, and Er3+. La3+ in the Chemical Formula 4 is any one selected from the group consisting of Yb3+, Nd3+, and Er3+.

Chemical Formula (3)

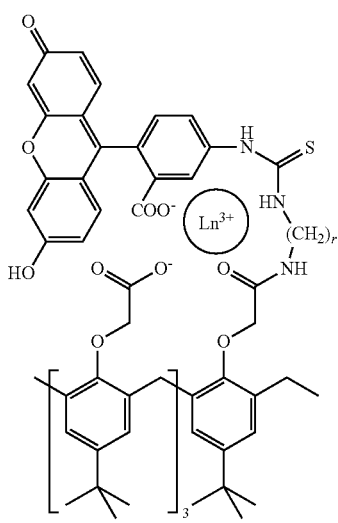

I, x = 3, 6

Chemical Formula (4)

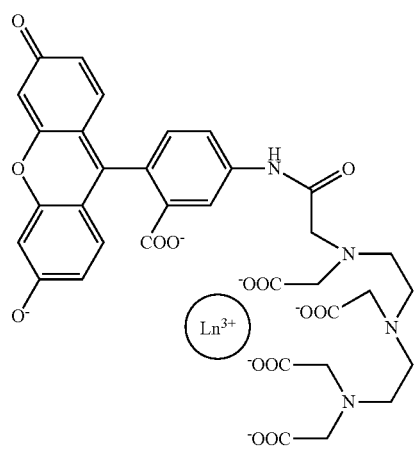

II

 = Yb³⁺, Nd³⁺, Er³⁺

The multinuclear metal complex may be copper phthalocyanine (CuPhthalocyanine) of a Chemical Formula 5.

Chemical Formula (5)

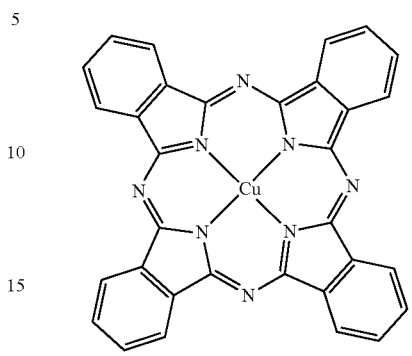

Second and third light emitting stacks 240 and 250 includes luminescent material layers EML2 and EML3, respectively, and each of the luminescent material layers may be formed by doping a host with a dopant. The luminescent material layers emit different colors. The dopant material may be added in the ratio of about 1 wt % to 30 wt % on the basis of the host material.

The materials of Chemical Formulas 1 to 5 are arranged to constitute the near-infrared conversion layer 174 and absorb visible light to emit near infrared. Here, the total ratio of the corresponding materials in the near-infrared conversion layer 174 may be limited to within a maximum of 10% of the total solid. Most of the near-infrared conversion layer 174 may be made of a photo acryl-based material based on organic matters, and a small amount of light conversion materials is included in the near-infrared conversion layer 174 to form the near-infrared conversion layer 174.

The display apparatus according to the embodiment of the present specification includes a liquid crystal display apparatus (LCD), a field emission display apparatus (FED), an organic light emitting display apparatus (OLED), and a quantum dot display apparatus.

The display apparatus according to the embodiment of the present specification may include a laptop computer, televisions, and computer monitors, which are a complete product or a final product including the LCM, the OLED module, the QD module, etc., an equipment display which includes an automotive display or other types of vehicles, and a set electronic device, a set device or set apparatus such as a mobile electronic device, for example, a smart phone, an electronic pad, or the like.

The display apparatus according to the embodiment of the present specification can be described as follows.

The display apparatus according to the embodiment of the present specification includes: a panel which includes a light emitting area and at least one non-light emitting area; a light emitting device which is disposed in the light emitting area and includes a first electrode, a light emitting stack, and a second electrode; a light converter which partitions an opening of the light emitting area and includes a light conversion material; and a capping layer disposed on the second electrode. The light converter includes a light conversion layer and a light amplifier.

In the display apparatus according to the embodiment of the present specification, the light conversion layer may cover an edge of the first electrode, and the light emitting stack and the second electrode may be disposed on the light conversion layer in such a manner as to overlap each other.

The display apparatus according to the embodiment of the present specification may further include a planarization layer between the light conversion layer and the light amplifier, and the light conversion layer may be disposed on the light amplifier and then they overlap each other.

In the display apparatus according to the embodiment of the present specification, the light conversion material may be a material that absorbs light in a visible light region and emits light in a near-infrared region.

In the display apparatus according to the embodiment of the present specification, the near-infrared may have a wavelength of 780 nm to 990 nm.

The display apparatus according to the embodiment of the present specification may further include a light receiver disposed near the light converter.

In the display apparatus according to the embodiment of the present specification, the light receiver may not overlap at least one of the light conversion layer, the planarization layer, and the light amplifier.

The display apparatus according to the embodiment of the present specification, the light receiver may further include a reflective electrode and a light absorption layer.

In the display apparatus according to the embodiment of the present specification, the second electrode and the capping layer extend over the light conversion layer, and a part of the light the near-infrared region emitted from the light conversion layer is reflected from an interface between the second electrode and the capping layer, so that constructive interference may occur.

A display apparatus according to the embodiment of the present specification includes: a substrate: a transistor disposed on the substrate; an organic light emitting diode disposed on the transistor; a capping layer disposed on the organic light emitting diode; an encapsulation part disposed on the capping layer; a cover glass disposed on the encapsulation part; a near-infrared converter which is disposed in the form of matrix and partitions an opening. The organic light emitting diode includes a first electrode, a light emitting stack, and a second electrode. The near-infrared converter includes a light conversion layer and a light amplifier, and the capping layer extends to a top of the light conversion layer.

The display apparatus according to the embodiment of the present specification may have a feature that the light conversion layer may include a light conversion material, and the light conversion material absorbs light in a visible region and emits light in a near infrared region.

In the display apparatus according to the embodiment of the present specification, light in the near-infrared region emitted from the light conversion layer may be reflected on a top of the light amplifier.

In the display apparatus according to the embodiment of the present specification, a part of the light in a near-infrared region reflected from a bottom surface of the capping layer disposed on the light conversion layer meets the light in a near-infrared region reflected from the top surface of the light amplifier, so that constructive interference may occur.

The display apparatus according to the embodiment of the present specification may further include a near-infrared light receiver disposed adjacent to the near-infrared converter.

In the display apparatus according to the embodiment of the present specification, the transistor may include a semiconductor layer, a gate electrode, a source electrode, and a drain electrode, and the near-infrared light receiver may include a light absorption layer, a transparent electrode, and a reflective electrode.

In the display apparatus according to the embodiment of the present specification, the near-infrared reflected from an object outside the cover glass may be incident on the light absorption layer of the near-infrared light receiver, and a change in current of the light absorption layer may be detected In the display apparatus according to the embodiment of the present specification, the capping layer may extend to a top surface of the near-infrared light receiver, a part of the near-infrared may be reflected from the light absorption layer, and the part of the near-infrared reflected from the light absorption layer may be reflected from a bottom surface of the capping layer, so that constructive interference may occur.

The features, structures and effects and the like described in the described embodiments of the present disclosure are included in at least one embodiment of the present disclosure and are not necessarily limited to one embodiment. Furthermore, the features, structures, effects and the like provided in at least one embodiment of the present disclosure can be combined or modified in other embodiments by those skilled in the art to which the embodiments belong. Therefore, contents related to the combination and modification should be construed to be included in the scope of the present disclosure.

The present disclosure described above is not limited to the above-described embodiments and the accompanying drawings, and it will be understood by those skilled in the art that various changes in form and details may be made therein without departing from the spirit and scope of the disclosure as defined by the appended claims. Therefore, the scope of the present disclosure is described by the scopes of the following claims, and all alternatives, modifications, and variations which are derived from the meaning and scope of the claims and equivalents thereto should be construed as being included in the scope of the present disclosure.

What is claimed is:

1. A display apparatus comprising:
a panel which comprises a light emitting area and at least one non-light emitting area;
a light emitting device which is disposed in the light emitting area and comprises a first electrode, a light emitting stack, and a second electrode;
a light converter which partitions an opening of the light emitting area and comprises a light conversion material; and
a capping layer disposed on the second electrode,
a light receiver disposed near the light converter;
wherein the light converter comprises a light conversion layer and a light amplifier and the light receiver comprises a light absorption layer;
wherein a thickness from a top of the light amplifier to a bottom of the second electrode or to a bottom of the capping layer and a thickness from a top of the light absorption layer to the bottom of the second electrode or to the bottom of the capping layer is in a range of 1.275 μm to 6.375 μm so that constructive interference occurs.

2. The display apparatus of claim 1, wherein the light conversion layer covers an edge of the first electrode, and the light emitting stack and the second electrode are disposed on the light conversion layer in such a manner as to overlap each other.

3. The display apparatus of claim 1, further comprising a planarization layer between the light conversion layer and the light amplifier, wherein the light conversion layer is disposed on the light amplifier and then they overlap each other.

4. The display apparatus of claim 2, wherein the light conversion material is a material that absorbs light in a visible light region and emits light in a near-infrared region.

5. The display apparatus of claim 4, wherein the near-infrared has a wavelength of 780 nm to 990 nm.

6. The display apparatus of claim 1, wherein the light receiver does not overlap at least one of the light conversion layer, the planarization layer, and the light amplifier.

7. The display apparatus of claim 1, wherein the light receiver further comprises a reflective electrode.

8. The display apparatus of claim 4,
wherein the second electrode and the capping layer extend over the light conversion layer,
and wherein a part of the light the near-infrared region emitted from the light conversion layer is reflected from an interface between the second electrode and the capping layer, so that the constructive interference occurs.

9. A display apparatus comprising:
a substrate:
a transistor disposed on the substrate;
an organic light emitting diode disposed on the transistor;
a capping layer disposed on the organic light emitting diode;
an encapsulation part disposed on the capping layer;
a cover glass disposed on the encapsulation part; and
a near-infrared converter which is disposed in the form of matrix and partitions an opening,
a near-infrared light receiver disposed adjacent to the near-infrared converter;
wherein the organic light emitting diode comprises a first electrode, a light emitting stack, and a second electrode,
and wherein the near-infrared converter comprises a light conversion layer and a light amplifier, the near-infrared light receiver comprises a light absorption layer and the capping layer extends to a top of the light conversion layer,
wherein a thickness from a top of the light amplifier to a bottom of the second electrode or to a bottom of the capping layer and a thickness from a top of the light absorption layer to the bottom of the second electrode or to the bottom of the capping layer is in a range of 1.275 μm to 6.375 μm so that constructive interference occurs.

10. The display apparatus of claim 9, wherein the light conversion layer comprises a light conversion material, and wherein the light conversion material absorbs light in a visible light region and emits light in a near-infrared region.

11. The display apparatus of claim 10, wherein the light in a near-infrared region emitted from the light conversion layer is reflected from a top surface of the light amplifier.

12. The display apparatus of claim 11, wherein a part of the light in a near-infrared region reflected from a bottom surface of the capping layer disposed on the light conversion layer meets the light in a near-infrared region reflected from the top surface of the light amplifier, so that the constructive interference occurs.

13. The display apparatus of claim 1, wherein the transistor comprises a semiconductor layer, a gate electrode, a source electrode, and a drain electrode, and wherein the near-infrared light receiver further comprises a transparent electrode, and a reflective electrode.

14. The display apparatus of claim 13, wherein the near-infrared reflected from an object outside the cover glass is incident on the light absorption layer of the near-infrared light receiver, and a change in current of the light absorption layer is detected.

15. The display apparatus of claim 13, wherein the capping layer extends to a top surface of the near-infrared light receiver, wherein a part of the near-infrared is reflected from the light absorption layer, and the part of the near-infrared reflected from the light absorption layer is reflected from a bottom surface of the capping layer, so that the constructive interference occurs.

* * * * *